UNITED STATES PATENT OFFICE.

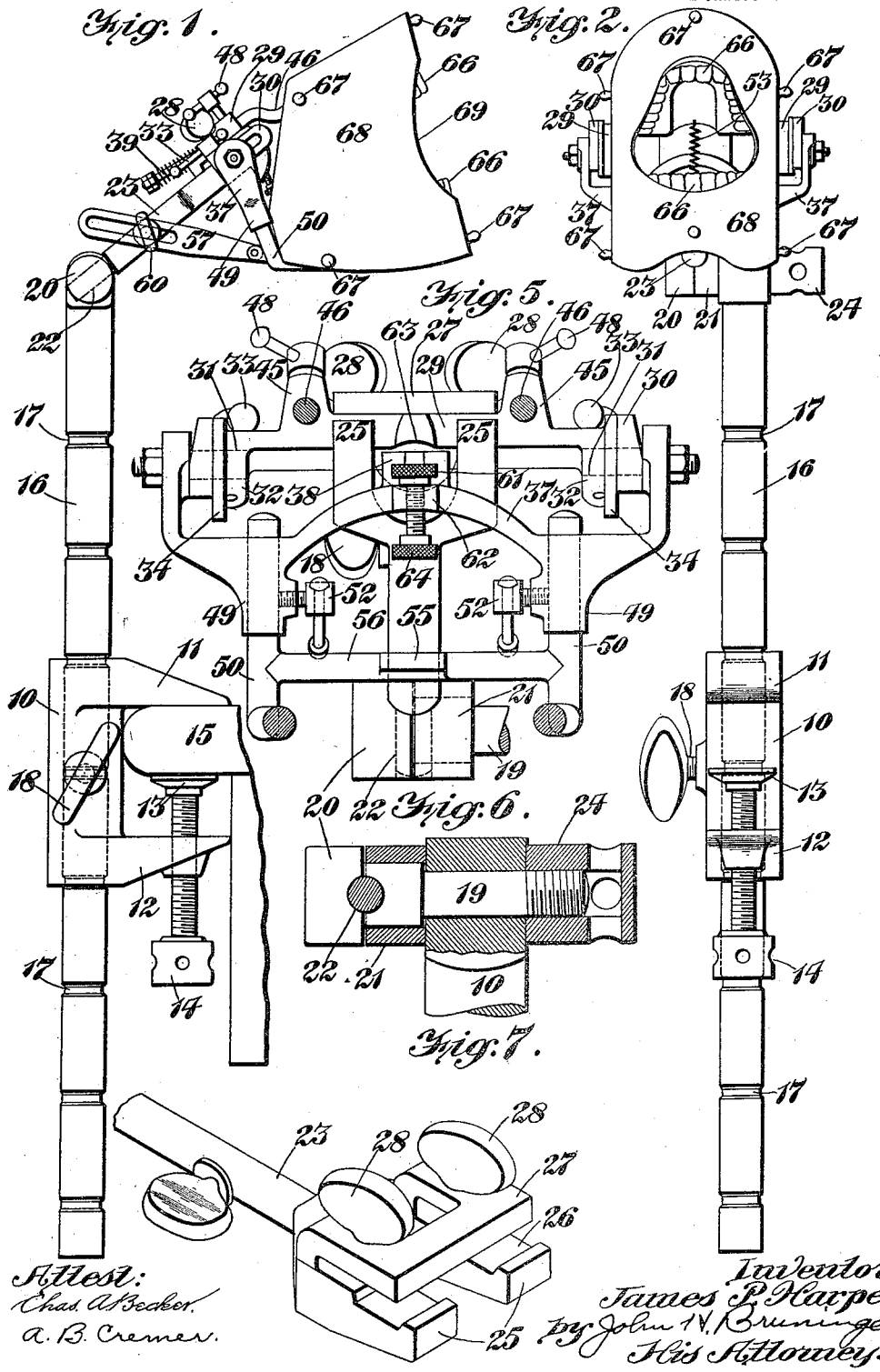

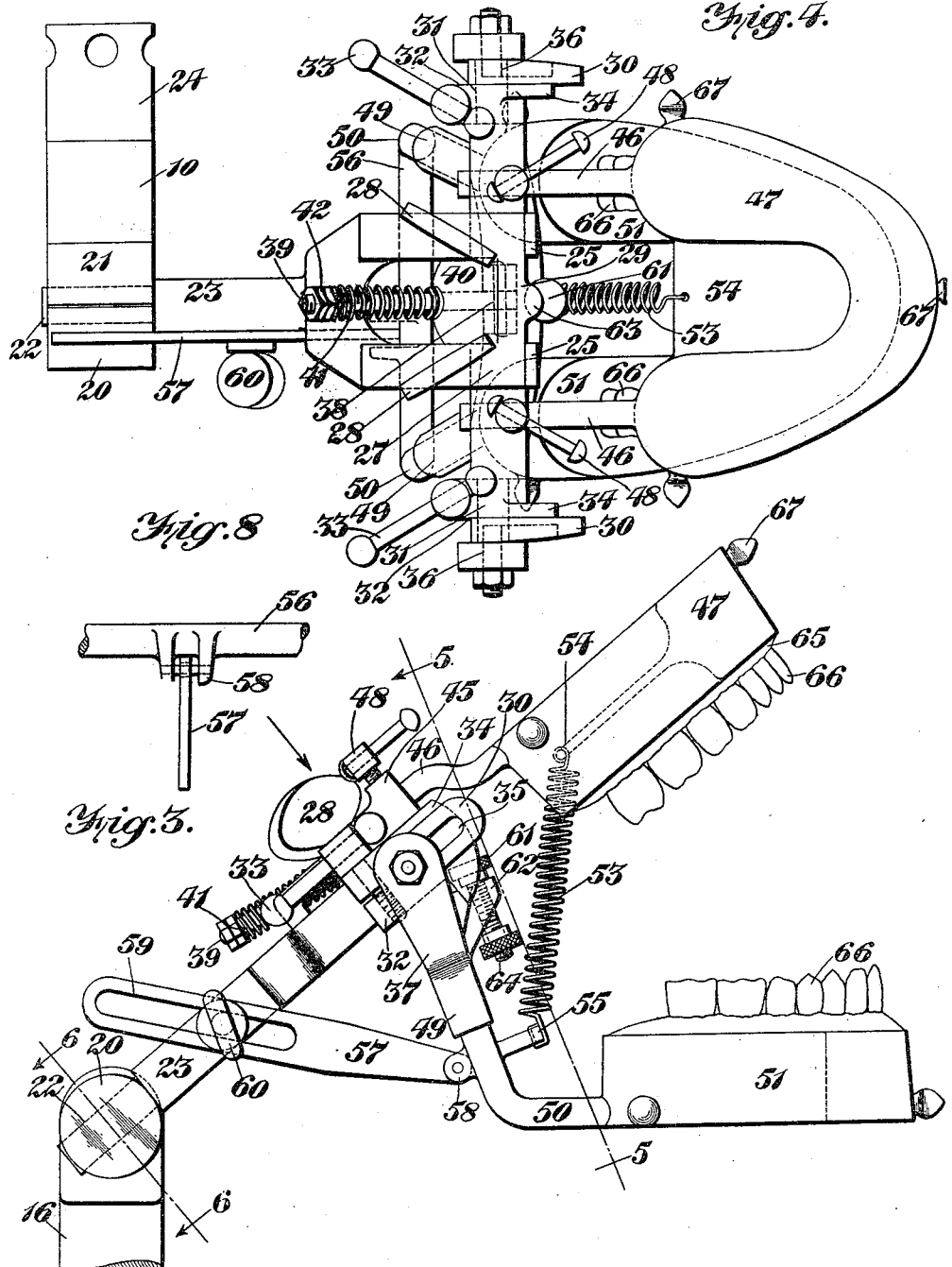

JAMES P. HARPER, OF ST. LOUIS, MISSOURI.

DENTAL TECHNICON.

1,194,017.  Specification of Letters Patent.  Patented Aug. 8, 1916.

Application filed April 6, 1914. Serial No. 829,854.

*To all whom it may concern:*

Be it known that I, JAMES P. HARPER, a citizen of the United States, and residing at St. Louis, in the State of Missouri, have invented certain new and useful Improvements in Dental Technicons, of which the following is a specification.

This invention relates to a dental technicon.

Dentistry consists of two parts, namely, theory and practice. The practice consists in the acquisition by the student of the mechanical skill and dexterity required to perform the mechanical operations upon the teeth. As dentistry is now taught, the student, during the first part of the course, performs different mechanical operations on extracted or artificial teeth, either singly or on sets in trays, and this is supplemented by practice upon living patients in the clinic, during the latter part of the course and after the student has obtained some mechanical skill. Since, however, the number of living patients available for experimenting is limited, and since the period of operation is necessarily limited, the opportunities for practice under natural conditions are likewise limited.

Now, while the student is able to obtain some skill in performing operations on extracted or artificial teeth, as now practised, the conditions under which he does this work are so much more favorable than in practice, that the student, even if skilful, has considerable difficulty in performing the operations in the cramped space and under the unfavorable conditions, requiring the use of reflected light, that are encountered in the mouth of a living patient.

The invention generally stated comprises a base provided with a carrier on which a dental articulator having tooth receiving trays is mounted, and the parts may be adjustable for disposing the articulator, which may have removable trays and a removable shield, in different positions, it being understood that the articulator may be of either the standard or anatomical type.

Some of the objects of this invention, therefore, are to provide a dental technicon which is so constructed as to permit the employment of an ordinary dental articulator for holding the teeth to be operated upon, and in which the articulator is so mounted and arranged as to simulate the conditions which are encountered in a living patient, to enable the student to perform all the mechanical operations that the dentist performs on the teeth of a living patient, and under the same conditions which are there encountered.

Another object is to provide a dental technicon which is simple in construction and operation, capable of various adjustments, and which is not liable to get out of repair.

Further objects will appear from the detail description taken in connection with the accompanying drawings, in which:

Figure 1 is a side elevation of the dental technicon embodying this invention. Fig. 2 is a front elevation, Fig. 3 is an enlarged detail side elevation, with the shield removed, Fig. 4 is a plan, Fig. 5 is a section on the line 5—5, Fig. 3, Fig. 6 is a section on the line 6—6, Figs. 1 and 3, Fig. 7 is a detail perspective view of the carrier, and, Fig. 8 is a detail.

Referring to the accompanying drawings, 10 designates a base having a pair of jaws 11, 12, the jaw 12 being threaded to receive a clamping member 13 provided with a head 14, whereby the base may be clamped to a bench 15, or the like. The base 10 is bored to receive a vertical bar or support 16, and this bar is provided with a series of circumferential recesses 17 adapted to receive a clamping screw 18, so that the support may be held rotatively in the base in different vertical positions, and also clamped against rotation. The upper end of the support is bored to receive a shank 19 provided with a head 20 and adapted to receive a sleeve 21. The shank and the sleeve are apertured and notched to receive the end 22 of a carrier 23, and the end of the shank is threaded to receive a clamping nut 24. With this construction, the carrier can be moved vertically on the support to different angular positions, as well as rotatively or laterally, and can be clamped in any desired adjusted position. The carrier 23 is adapted to receive and adjustably support a suitable articulator, which may be of the standard or anatomical type. In this particular embodiment the articulator is of the anatomical type. For this purpose the carrier 23 is provided with a pair of jaws 25, recessed as shown at 26, and provided with a clamping plate 27 attached to the carrier by means of clamping screws 28. The carrier is adapted to receive the articulator jaw 29, which is positioned and clamped in the recesses 26, and clamped in position by means of the clamping plate 27 and the clamping screws 28. The jaw 29 has mounted on each end thereof a bracket 30, which is provided with a shaft 31, mounted in the split end 32 of the bracket and clamped in position by means of a clamping screw 33. This construction permits the bracket to be independently adjusted angularly on the jaw, the brackets being provided with graduated sectors 34 for predetermining the amount of adjustment. The brackets are slotted, as shown at 35, to receive pintles 36 of a movable articulator jaw 37. The jaw 37 has loosely pivoted thereto at 38 a bar 39, which passes loosely through a lug 40 on the bracket 30, and has a spring 41 thereon which bears, at one end, against the lug 40, and, at its other end, against nuts 42 on the link. The pivotal connection of the jaw 37 and the link 39 is on a line with the pintles 36, so as to permit free swinging movement of the lower articulator jaw with respect to the upper articulator jaw, and the provision of the slots 35, and the loose connection of the lower jaw to the link 39, permits transverse movement of the lower jaw with respect to the upper jaw, the faces of the brackets 30 being rounded to permit the necessary angular movement.

The upper articulator jaw 29 has formed thereon apertured bosses 45 adapted to receive the shanks 46 of an upper plate or tray 47, this plate or tray being secured in adjusted position in the bosses by means of clamping screws 48. The lower articulator jaw has formed thereon apertured bosses 49 adapted to receive the shanks 50 of a lower plate or tray 51, which is secured in adjusted position in the jaw 37 by means of clamping screws 52. A spring 53, connected, at one end, to a lug 54 on the upper plate 47, and, at its other end, to a lug 55 on a cross bar 56 connecting the shanks 50, is adapted to normally move the jaws with the plates thereon toward each other. A link 57 is loosely pivoted, at one end, between a pair of lugs 58 on the cross bar 56, and has its other end slotted, as shown at 59, to receive a clamping screw 60 on the carrier 23. With this construction, the lower jaw may be clamped in different angular positions with respect to the upper jaw. The lower jaw may be further provided with an adjusting stop screw 61 passing through a lug 62 on the jaw, and adapted to engage a lug 63 on the upper jaw. A lock-nut 64 is provided for locking this adjusting screw in position.

The trays 47 are recessed to receive plaster 65 for the reception of artificial teeth 66. The trays are further provided with lugs or buttons 67 arranged forwardly and laterally thereon, and adapted to enter apertures or button holes in a rubber shield 68, which shield is cut away at its center, as shown at 69, to form an open mouth.

When the parts are in the position shown in Figs. 1 and 2, with the carrier 23 positioned at a suitable angle with respect to the support 16, with the articulator jaws separated and clamped in separated position, and with the shield applied, the relation of the teeth on the trays is similar to that in a living patient. By providing the trays with teeth formed with cavities, etc., as in living patients, the student is enabled to perform the mechanical operations of filling, grinding, etc., under practically the same conditions as are encountered when these operations are performed on the teeth of living patients. The space in which the student must perform these operations is cramped, and the shield, which represents the position of the cheeks of a patient, interposes the same mechanical difficulties that the dentist encounters in practical operations on living persons. By arranging the articulator jaws so that they may be clamped in different spaced positions against opening and closing movements, the teeth may be brought more or less closely together, as the skill of the student increases, so as to simulate natural conditions. In view of the fact that the lower articulator jaw has a transverse movement with respect to the upper articulator jaw, when the jaws are closed, as well as open, the same movements can be obtained as are obtained under practical conditions in the mouth of the patient, and the operations can, therefore, be performed and tested in such a manner that the teeth will be in occlusion in all relative positions of the jaws. It will be noted that the loose pivotal connections of the lower jaw with the links 39 and 57 permits such lateral movement. By providing removable trays for the teeth, which are arranged to be clamped in different adjusted positions in the jaws, the device may be used with different sets of teeth, to enable different operations to be performed by the student. The support may be raised to different heights to suit conditions, and may be rotated to any suitable position. The carrier may also be adjusted to different angular relations, both vertically and laterally about independent transverse axes, to simulate natural conditions. In all of these positions of parts, the jaws will be held firmly in the adjusted positions, while the student performs the technical operations.

By the use of this device, the student is able to perform all the mechanical operations that the dentist performs in the living patient. The student is thus able to acquire the digital dexterity within a few months that would take several years to acquire if he were compelled to depend upon the ordinary clinical method of acquiring digital skill by practising upon occasional living patients in the clinic.

The articulator jaws are of skeleton or open construction so as to render all parts accessible for adjustment to suit different conditions and different sets of teeth. This open construction also permits the apparatus to be readily cleaned, repaired and assembled and disassembled, and keeps its bulk down to a minimum. The trays are so attached to the jaws as to permit them to be conveniently removed and replaced. Such capability of adjustment, etc., is not possible where the apparatus is in the form of a manikin, which is necessarily of great bulk, and necessarily cumbersome to use and operate.

It is obvious that various changes may be made in details of construction without departing from the spirit of this invention, and it is to be understood, therefore, that this invention is not to be limited to the specific construction shown and described.

Having thus described the invention, what is claimed is:

1. A dental technicon comprising a base, a carrier thereon, an articulator mounted on said carrier and comprising teeth holding jaws, and means for holding said jaws in relatively adjusted positions constructed and arranged to permit dental operations on the teeth.

2. A dental technicon comprising a base, a carrier thereon, an articulator mounted on said carrier and comprising teeth holding jaws, means for holding said jaws in relatively adjusted position, and a flexible shield applied to the articulator, said parts being constructed and arranged to permit dental operations on the teeth.

3. A dental technicon comprising a base, a carrier adjustably mounted thereon, an articulator mounted on said carrier and comprising teeth holding jaws, and means for holding said jaws in relatively adjusted positions constructed and arranged to permit dental operations on the teeth.

4. A dental technicon comprising a base, a rotatable support mounted thereon, an articulator comprising teeth holding jaws, means for holding said jaws in relatively adjusted position, and adjustable connections between the articulator and support, said parts being constructed and arranged to permit dental operations on the teeth.

5. A dental technicon comprising a base, a vertically adjustable, rotatable support mounted thereon, an articulator comprising teeth holding jaws, means for holding said jaws in relatively adjusted position, and connections between the articulator and support, said parts being constructed and arranged to permit dental operations on the teeth.

6. A dental technicon comprising a base, a vertically adjustable rotary standard mounted thereon, an arm pivoted on said standard to swing in a vertical plane, an articulator carried by said arm comprising teeth holding jaws, and means for holding said jaws in relatively adjusted positions constructed and arranged to permit dental operations on the teeth.

7. A dental technicon comprising a base, a carrier thereon, an articulator mounted on said carrier and comprising teeth holding jaws, means for holding said jaws in relatively adjusted position, and a flexible shield detachably engaged with said articulator and provided with a mouth opening, said parts being constructed and arranged to permit dental operations on the teeth.

8. A dental technicon comprising a base, a carrier thereon, an articulator mounted on said carrier and comprising teeth holding jaws, means for holding said jaws in relatively adjusted position, said articulator having radial lugs, and a flexible shield detachably engaging said lugs, said parts being constructed and arranged to permit dental operations on the teeth.

9. A dental technicon comprising a base, a vertically adjustable standard rotatably sustained thereby, a carrier adjustably mounted on the standard, an articulator supported by said carrier comprising teeth holding jaws, and means for holding said jaws in relatively adjusted positions, whereby the articulator may be adjustably disposed in positions for various dental operations on said teeth.

10. A dental technicon comprising a base, a vertically adjustable standard rotatably sustained thereby, a rotatable carrier arm mounted on said standard for vertical radial movement, and an articulator supported by said carrier arm and comprising teeth holding jaws, and means for holding said jaws in relatively adjusted positions, whereby said articulator may be adjustably disposed in positions for various dental operations on said teeth.

11. A dental articulator comprising a pair of tooth receiving trays pivotally connected for relative movement, a spring tending to move the trays toward each other, and means for holding the trays against the action of said spring in relatively adjusted position.

12. A dental articulator comprising a pair of tooth receiving trays pivotally connected for relative movement, a spring tending to move the trays in one direction, and means for holding them in relatively adjusted position against the action of said spring.

13. A dental articulator comprising a pair of tooth receiving trays pivotally connected for relative movement, and means for adjustably holding said trays in a plurality of relatively adjusted positions.

14. A dental articulator comprising a pair of pivotally connected tooth receiving trays, a spring tending to move said trays relatively toward each other, means adjustably moving the trays relatively away from each other, and means for fixing the trays in relatively adjusted positions.

15. A dental technicon comprising a fixable support, a tooth carrying jaw mounted on said support, a second tooth carrying jaw mounted for movement toward and from said first jaw, lugs or buttons arranged forwardly and laterally on said jaws, and a shield having apertures or button holes adapted to detachably engage said lugs or buttons.

In testimony whereof I affix my signature in the presence of these two witnesses.

JAMES P. HARPER.

Witnesses:
J. N. BRUNINGA,
FRANKLIN MILLER.

Copies of this patent may be obtained for five cents each, by addressing the "Commissioner of Patents, Washington, D. C."